United States Patent [19]
Chan et al.

[11] Patent Number: 6,122,717
[45] Date of Patent: Sep. 19, 2000

[54] METHODS AND APPARATUS FOR A MEMORY THAT SUPPORTS A VARIABLE NUMBER OF BYTES PER LOGICAL CELL AND A VARIABLE NUMBER OF CELLS

[75] Inventors: Raymond K. Chan; Mario F. Au, both of Fremont, Calif.

[73] Assignee: Integrated Device Technology, Inc., Santa Clara, Calif.

[21] Appl. No.: 08/664,873

[22] Filed: Jun. 17, 1996

[51] Int. Cl.[7] .................................................. G06F 12/02
[52] U.S. Cl. ..................... 711/170; 711/173; 711/171; 711/172
[58] Field of Search ..................................... 395/850, 884, 395/894, 307; 711/170, 171, 172, 173, 219

[56] References Cited

U.S. PATENT DOCUMENTS

| | | | |
|---|---|---|---|
| 4,703,418 | 10/1987 | James | 710/32 |
| 5,189,671 | 2/1993 | Cheng | 370/471 |
| 5,517,631 | 5/1996 | Machado et al. | 711/111 |
| 5,859,990 | 1/1999 | Yarch | 710/131 |

OTHER PUBLICATIONS

QS6810 Advance Information Datasheet, Rev. 1.1, Apr., 1995, entitled: "4:1 ATM Multiplexer/Demultiplexer (AMDM)".

*Primary Examiner*—B. James Peikari
*Attorney, Agent, or Firm*—Stattler Johansen & Adeli, LLP

[57] ABSTRACT

A first-in-first-out (FIFO) memory device includes a plurality of FIFO memory cores that contain a plurality of cells. A variable cell size circuit supports user programmable cell sizes in a FIFO memory device to permit selection of a wide range of cell sizes. The variable cell size circuit controls successive accesses to a cell in the memory device, and it resets a byte count when the byte count equals the cell size value to initialize the circuit for a subsequent access operation. The variable cell size circuit further includes a prediction circuit that indicates completion of access to the cell a predetermined number of counts prior to completion of the actual access. An alignment circuit generates data for write operations in cells that store an odd number of bytes per cell to compensate for the two byte per cell read operations. Each FIFO memory core includes a circuit that generates a cell available signal to indicate whether a cell in a corresponding FIFO memory core is available for reading. An arbiter receives the cell available signals, and it generates control signals to select one of the FIFO memory cores. An output selection circuit utilizes the control signals to output data from one of the FIFO memory cores. The FIFO memory device further includes a plurality of output pins that receive the cell available signals and that receive the cell size information.

18 Claims, 10 Drawing Sheets

METHODS AND APPARATUS FOR A MEMORY THAT SUPPORTS A VARIABLE NUMBER OF BYTES PER LOGICAL CELL AND A VARIABLE NUMBER OF CELLS

BACKGROUND OF THE INVENTION

1. Field of the Invention

The present invention is directed toward the field of memory, and more particularly to a first-in-first-out (FIFO) memory device that includes programmable cell sizes and multiplexing among FIFO memory cores.

2. Art Background

There are many types of memory devices that are used to store data. One type of memory device is known as a first-in-first-out (FIFO) memory or buffer. In a FIFO memory, data is stored in a sequential order as data is written to the device. Typically, FIFO devices maintain a write pointer that specifies the location or address to write the next data entry into the FIFO. For each write operation, the write pointer is incremented. The FIFO memory is sequentially read in the same order as it was written. Typically, to implement a read operation, a read pointer is maintained, and the read pointer is incremented for each subsequent read operation. Thus, the data that is first written to the FIFO device is also the data that is first read from the FIFO device.

FIFO memories have many uses in circuit applications. For example, FIFOs may be used as a queue for storing packets of data in a network device. For the network application, data packets are stored in the FIFO in the sequential order that they are written. For routing or distribution, the data packets are sequentially read starting with the first data packets written.

A specification, known as the universal test and operation physical (PHY) interface for asynchronous transfer mode (ATM) or the UTOPIA specification, defines an interface between the ATM physical media layer and the ATM layer itself. As set forth in the UTOPIA specification, the storage of data in the FIFO device may be arranged in cells. In this configuration, sequential write operations are executed to fill an entire cell with data. Similarly, sequential read operations are executed on a cell to read all data stored in that cell. The UTOPIA specification specifies a cell size of 53 bytes per cell. Although the 53 bytes per cell may be suited for certain applications, other applications, such as different network standards that use different packet sizes, may be suited for different cell sizes. The ability to select the number of bytes per cell provides a more flexible FIFO device that may be suited for more applications. For example, a device may be configured to permit the selection of a wide range of cell sizes. Consequently, it is desirable to develop a FIFO memory that permits a user to specify a cell size by selecting the number of bytes for each cell.

SUMMARY OF THE INVENTION

A variable cell size circuit supports user programmable cell sizes in a memory device. The variable cell size circuit includes a counter and a comparator, and it controls successive accesses to a cell in the memory device. The comparator receives a cell size value that specifies the number of bytes for the current cell. The counter generates a count that specifies a number of accesses to the cell, and the comparator compares the count with the cell size value. In addition, the comparator resets the counter when the count equals the cell size value to initialize the circuit for a subsequent access operation. In one embodiment, the memory comprises a first-in-first-out (FIFO) memory, and the access operations include read and write operations to the cell. The variable cell size circuit further includes a prediction circuit that indicates completion of access to the cell a predetermined number of counts prior to completion of the actual access.

In one embodiment, the FIFO memory device supports a one byte write operation and a two byte read operation. For this embodiment, an alignment circuit generates data for write operations in cells that store an odd number of bytes per cell to compensate or align for the two byte per cell read operations. Specifically, the alignment circuit programs predetermined data into an additional byte position, during a byte insertion operation, and it programs over a previously written byte position in a byte deletion operation.

In one embodiment, the first-in-first-out (FIFO) memory device includes a plurality of FIFO memory cores that contain a plurality of cells. Each FIFO memory core includes a circuit that generates a cell available signal to indicate whether a cell in a corresponding FIFO memory core is available for reading. An arbiter receives the cell available signals, and it generates control signals to select one of the FIFO memory cores. An output selection circuit utilizes the control signals to output data from one of the FIFO memory cores. In one embodiment, the arbiter contains a round robin sequencer for selecting a FIFO memory core with a cell available in a sequential order. The FIFO memory device further includes a plurality of output pins that receive the cell available signals and that receive a prediction signal. Thus, the cell available information and the prediction signal are output externally from the FIFO device.

DETAILED DESCRIPTION OF THE PREFERRED EMBODIMENTS

Figure 1:
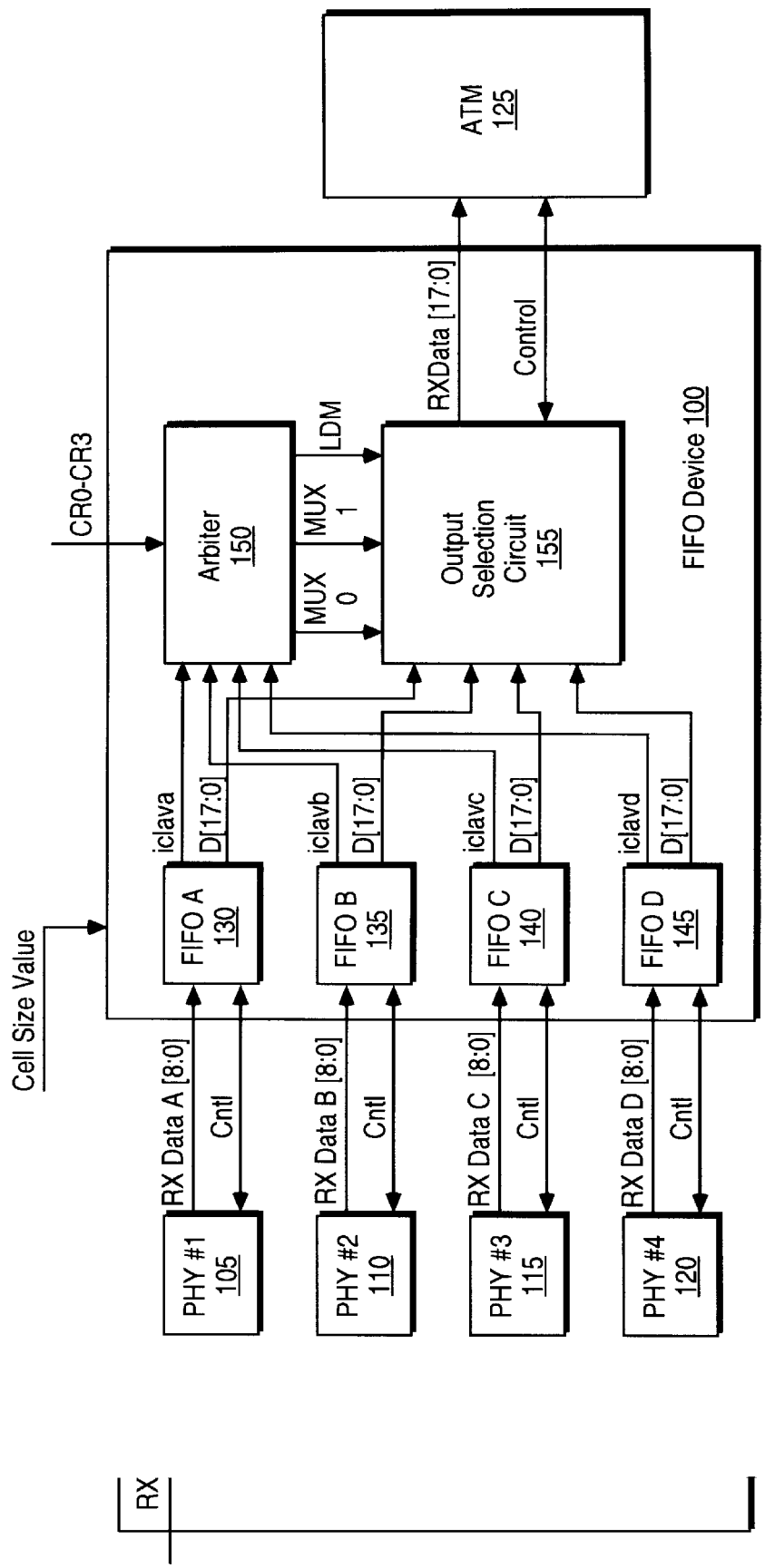
FIG. 1 is a block diagram illustrating one embodiment for a FIFO device that has programmable cell sizes and optimal cell selection functions.

FIG. 1 is a block diagram illustrating one embodiment for a FIFO device that has programmable cell sizes and optimal cell selection functions. A first-in-first-out (FIFO) device 100 contains a plurality of FIFO memory blocks (FIFO A, FIFO B, FIFO C, and FIFO D) labeled 130, 135, 140 and 145, respectively. Although the embodiment for the FIFO device 100 shown in FIG. 1 includes four FIFO memory blocks, any number of FIFO memory blocks may be used without deviating from the spirit and scope of the invention. In one embodiment, the FIFO device 100 is implemented on an integrated circuit (IC) device. The FIFO device 100 further includes an arbiter 150 and an output selection circuit 155. In general, the arbiter 150 and output selection circuit 155 select data, from one of the FIFO memory blocks (FIFO A 130, FIFO B 135, FIFO C 140, and FIFO D 145), and they transmit data to an external output device.

In FIG. 1, a number of external devices are shown coupled the FIFO device 100. A plurality of physical devices, labeled PHY#1 105, PHY#2 110, PHY#3 115, and PHY#4 120 are coupled to the FIFO device 100 at memory block FIFO A 130, memory block FIFO B 135, memory block FIFO C 140, and memory block FIFO D 145, respectively. In one embodiment, each physical device transmits data to a memory block in accordance with the UTOPIA specification. As shown in FIG. 1, each interface includes a nine bit data bus (RXDataA[8:0], RXDataB[8:0], RXDataC[8:0], and RXDataA[8:0]), and control signals (Cntl). During a write operation, nine bits of data are input from each physical device to a FIFO memory block.

For purposes of explanation, the output of the FIFO device 100 is shown coupled to an asynchronous transfer mode (ATM) device 125. In accordance with the UTOPIA specification, the FIFO device 100, through use of the arbiter 150 and output selection circuit 155, outputs 18 bits of data on a data bus (RXData[17:0]). In addition, the output selection circuit 155 and the external device, ATM 125, interface through a plurality of control lines, labeled control 155 on FIG. 1.

The memory blocks (FIFO A 130, FIFO B 135, FIFO C 140, and FIFO D 145) each generate a signal (iclav_a, iclav_b, iclav_c, and iclav_d) that indicates whether a cell is available for a read operation in the corresponding memory block. In general, the arbiter 150 receives the cell available signals (iclav_a, iclav_b, iclav_c, and iclav_d) from each memory block (FIFO A 130, FIFO B 135, FIFO C 140, and FIFO D 145), and in return, it controls, based on cell availability, selection of one of the memory blocks for a read operation. As is explained more fully below, the cell available signals (iclav_a, iclav_b, iclav_c, and iclav_d) are transmitted external to the FIFO device 100 to permit external selection of a memory block for a read operation. In one embodiment, the arbiter 150 is implemented as a round robin sequencer. For the round robin sequencer embodiment, the arbiter 150 sequentially selects the next memory block with an available cell for a read operation (e.g. the arbiter 150 selects FIFO A 130, FIFO B 135, FIFO C 140, and FIFO D 145 in a sequential order).

For the embodiment illustrated in FIG. 1, each FIFO block may be programmed to operate with a specified number of bytes per cell. In one embodiment, the cell size is programmed during the initialization or reset when the FIFO device 100 is powered up. Thus, the cell size is defined for a first write operation to a FIFO memory block. As is explained more fully below, the FIFO device 100 applies a wide range of cell sizes for programming during the reset period. In one embodiment that includes a nine bit input data bus and an eighteen bit output data bus, the write cell size is double the number of bytes per cell of a read cell size because the input data bus receives 9 bits, for the write operation, and the output data bus outputs 18 bits for a read operation. For example, if the write cell size is set to 10 bytes per cell, then the read cell size is 5 bytes per cell. Thus, each FIFO block is programmed after reset of initialization of the FIFO device 100.

Figure 2:
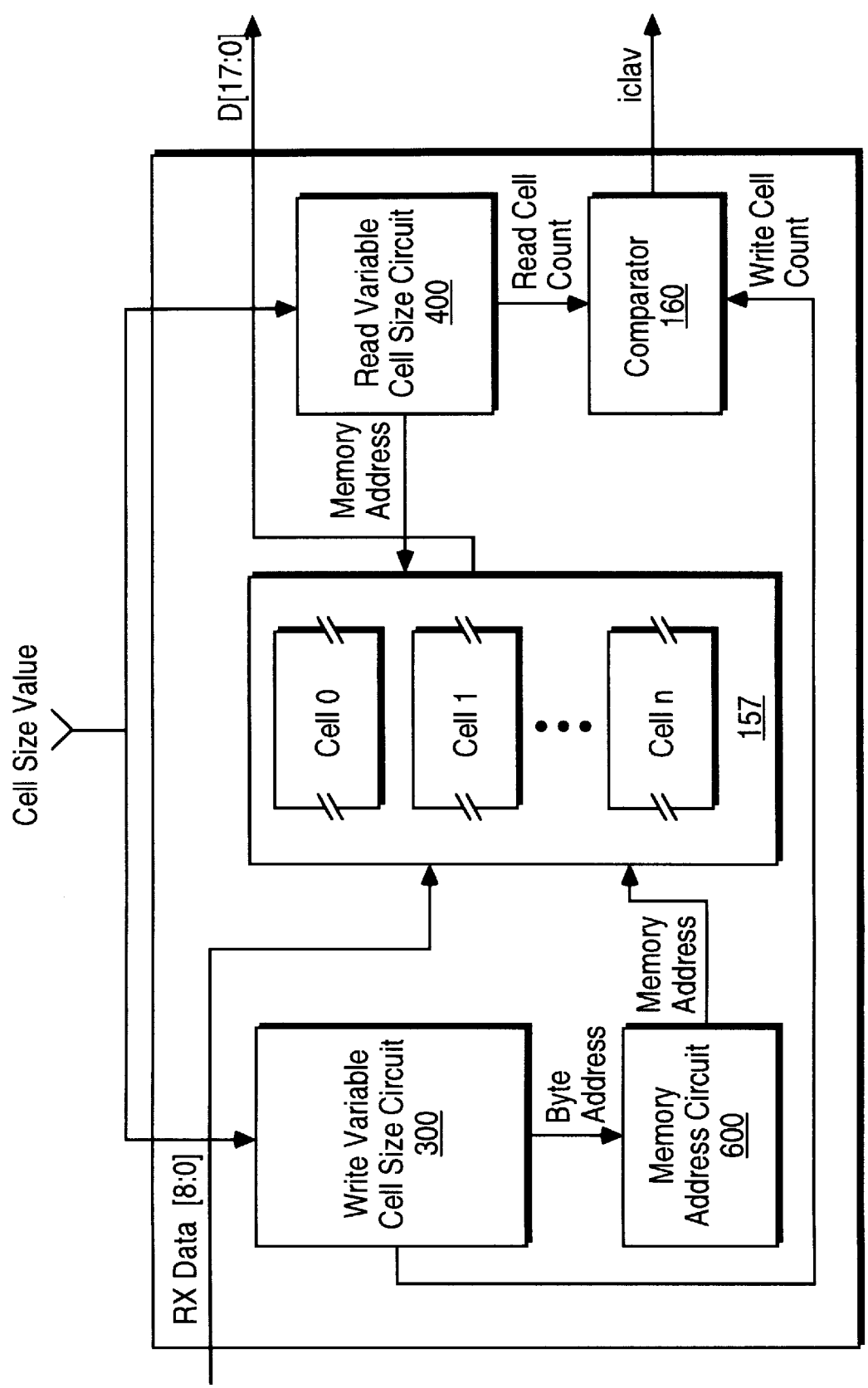
FIG. 2 is a block diagram illustrating a FIFO block configured in accordance with one embodiment of the present invention.

FIG. 2 is a block diagram of a FIFO block configured in accordance with one embodiment of the present invention. Each FIFO block (FIFO A 130, FIFO B 135, FIFO C 140, and FIFO D 145) includes a memory core, labeled 157 on FIG. 2 (e.g. there is one memory core for each FIFO block). The memory core 157 includes a plurality of cells shown as cells 0-n on FIG. 2. In one embodiment, cell sizes are programmed, by a user during reset, such that the memory core has a variable number of bytes per cell. For this embodiment, all memory cores are programmed to include the same number of bytes per cell. For example, if the user specifies a cell size of 8 bytes per cell, then FIFO A 130, FIFO B 135, FIFO C 140, and FIFO D 145 are all programmed to 8 bytes per cell. In one embodiment, the cells may be programmed from eight (8) bytes per cell to one hundred and twenty eight (128) bytes per cell. For this embodiment, each memory core includes 128 bytes. If the user specifies a cell size of 128 bytes per cell, then the memory core in each FIFO block includes 1 cell. Similarly, if the user specifies a cell size of 8 bytes per cell, then the memory core in each FIFO block includes 16 cells.

As shown in FIG. 2, the memory core 157 receives, on the input data bus RXData[8:0], nine bits of input data for a write operation, and it generates, on an output data bus D[17:0], 18 bits of output data for a read operation. In another embodiment, the output data bus may be expanded to include the output of more than one FIFO device. This embodiment is described more fully below in conjunction with FIG. 11.

As shown in FIG. 2, each FIFO block (FIFO A 130, FIFO B 135, FIFO C 140, and FIFO D 145) includes, in addition to the memory core 157, a write variable cell size circuit 300, a read variable cell size circuit 400, a memory address circuit 600, and a comparator circuit 160. In general, the write variable cell size circuit 300 in each FIFO block supports the variable cell size by controlling the number of write operations in accordance with the specified number of bytes per cell. As shown in FIG. 2, the write variable cell size circuit 300 receives the externally generated cell size value (e.g. cell size signal), and in response, it generates a byte address. Furthermore, the write variable cell size circuit 300 generates a write cell count for input to the comparator 160. The memory address circuit 600 generates a memory address during a write operation to a specified cell. In general, the memory address circuit 600 is utilized to byte align write operations to ensure predictable data for a subsequent read operation on that cell. The memory address circuit 600 and byte alignment are described more fully below.

The read variable cell size circuit 400 shown in FIG. 2 receives the external cell size value (e.g. cell size signal), and it generates a memory address for a read operation. Specifically, the read variable cell size circuit 400 in each FIFO block supports variable cell sizes by controlling the number of read operations in accordance with the specified number of bytes per cell (e.g. the number of bytes per cell specified for a write operation). The read variable cell size circuit 400 also generates a read cell count for the comparator 160. The comparator 160, which receives the read cell count and write cell count, generates a cell available signal (iclav). In general, the cell available signals (iclav_[a:d]) is input to the arbiter 150 to control selection of a FIFO block for a read operation.

Figure 3:
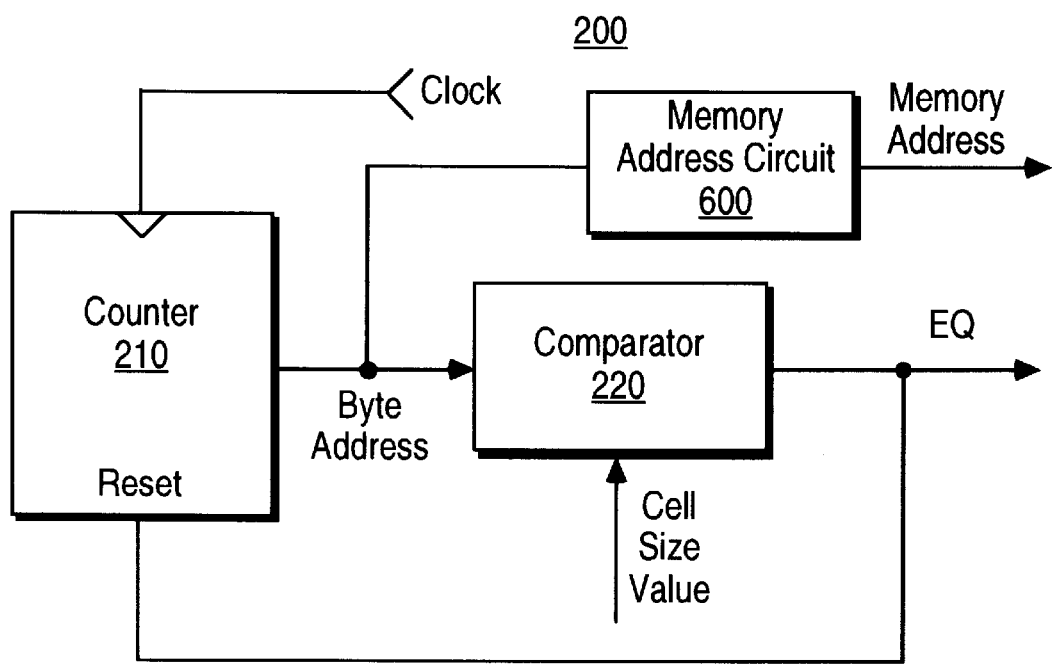
FIG. 3 is a block diagram illustrating a variable cell size circuit to define the number of bytes per cell.

FIFO Block Cell Size Programming:

FIG. 3 is a block diagram illustrating a variable cell size circuit to define the number of bytes per cell for an access operation to a cell. The variable cell size circuit may be used for a write or a read operation to memory. As shown in FIG. 3, the variable cell size circuit 200 includes a counter 210 and a comparator 220. The comparator 220 receives a value, entitled "cell size value", that defines the number of bytes per cell for the corresponding FIFO block. In one embodiment, the cell size value is a signal generated by the user, and it is input externally to the FIFO device 100 (FIG. 1). The counter 210 receives a clock, and for this embodiment, each clock cycle defines an access cycle (e.g. read and write operations are executed each clock cycle). The counter 210 generates the byte address for the access operation to the current cell. The comparator 220 generates an equal "EQ" signal when the byte address is equal to the cell size value.

In operation, the counter 210 generates a first byte address, such as (address 0), for a current cell. The comparator compares the byte address, for the first cell, with the externally input cell size value. During the next access cycle, signified by a new clock cycle, the counter 210 is incremented and a new byte address is generated. This cycle is repeated for each access cycle that the byte address is less than the cell size value. When the byte address equals the cell size value, signifying the last byte in the programmed cell size, an active "EQ" signal is generated. In turn, the counter 210 is reset to initialize the counter for the next cell. Thus, circuitry for the cell size programming is simplified to include a counter and a comparator. FIG. 3 also includes memory address circuit 600. For this embodiment, the memory address circuit 600 is utilized to generate a memory address from the byte address. One embodiment for the memory address circuit 600 is described more fully below in conjunction with FIG. 7.

In an alternative embodiment, a modulo-N counter (mod counter) may be used to solve the variable cell sizes problem. The mod counter, which transitions through a sequence of counts, may be implemented with flip flops and combination logic. However, the amount of combination logic required to implement a variable cell size circuit is increased if the FIFO device permits selection of a wide range of cell sizes. Because it is desirable to implement a circuit that supports selection of a wide range of cell sizes while minimizing the amount of logic, the variable cell size circuit 200 shown in FIG. 3 is a circuit implementation that minimizes the amount of logic over the use of a modulo-N counter.

Figure 4:
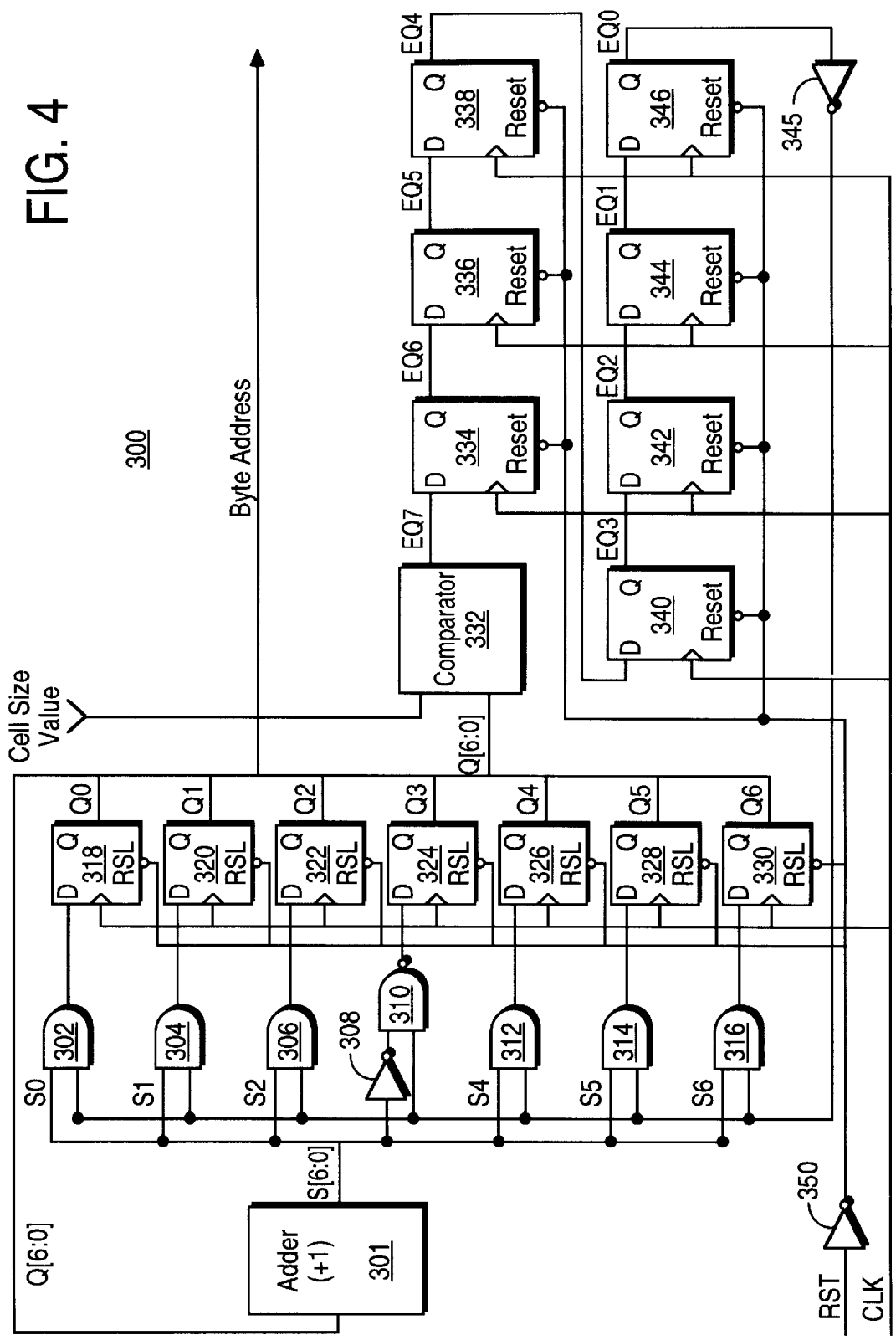
FIG. 4 illustrates one embodiment of a write variable cell size circuit.

FIG. 4 illustrates one embodiment of a write variable cell size circuit. For the embodiment illustrated in FIG. 4, the write variable cell size circuit 300 contains a counter consisting of an adder 301 and a plurality of counter flip-flops (318; 320, 322, 324, 326, 328 and 330). The counter flip-flops 318, 320 and 322 receive, during initialization, a low logic level on the reset pin (e.g. RSL=0) and a high logic level on the input (e.g. Q=1). The counter flip-flops 324, 326, 328 and 330 receive a low logic level on the reset pin (e.g. RSL=0) and a low logic level on the input (e.g. Q=0). The data Q[6:0] is input to the adder 301, which in turn, generates data S[6:0]. The data S[6:0] is the sum of 1+Q [6:0]. As shown in FIG. 4, the write variable cell size circuit 300 further includes combination logic including AND gates 302, 304, 306, 312, 314, and 316, inverters 308, 348, and 350, and a NAND gate 310. The combination logic is used to input values in counter flip-flops (318, 320, 322, 324, 326, 328 and 330) in each reset cell count operation in the manner discussed above.

The write variable cell size circuit 300 further includes a comparator 332 and a plurality of prediction flip-flops (334, 336, 338, 340, 342, 344, and 346). The prediction flip-flops (334, 336, 338, 340, 342, 344, and 346) are D type flip-flops. The comparator 332 receives data Q[6:0] and the externally generated cell size value, and it generates an active "EQ7" signal when the data value, Q[6:0], is equal to the cell size value. As shown in FIG. 4, the prediction flip-flops (334, 336, 338, 340, 342, 344, and 346) generate, in addition to the "EQ7" signal, signals "EQ6", "EQ5", "EQ4", "EQ3", "EQ2", "EQ1", and "EQ." As is described more fully below, the prediction signals are used to indicate the end of a write or read operation to a cell a predetermined number of cycles prior to the actual completion of the write or read operation. Thus, with the prediction mechanism, a subsequent write or read operation may be initiated prior to completion of the write or read operation to the current cell.

For the write variable cell size circuit embodiment illustrated in FIG. 3, there are seven "7" prediction flip-flops (334, 336, 338, 340, 342, 344, and 346). Thus, the combination logic, after an active "EQ" signal is output at flip-flop 346, generates a value of (8) "0001000" for input to the counter flip-flops (318, 320, 322, 324, 326, 328 and 330). On the next clock cycle, the output of counter flip-flops, due to the inversion of "EQ" signal to disable the combination logic gates (302,304, 306, 308, 310, 312, 314, and 316), has a value of "8." Therefore, the counter flip-flops (318, 320, 322, 324, 326, 328 and 330) are preset to a value of 7, and on the next clock cycle, the counter flip-flops start the count at "8." Based on this configuration, the value of the data Q[6:0] is set to the cell size value seven cycles prior to the completion of the generation of the active "EQ" signal from flip-flop 346.

For each access operation, which is executed in a corresponding clock (CLK) cycle, the adder 301 adds a value of "1" to the data Q[6:0]. During an access operation to a cell, the "EQ" signal is a low logic level. Therefore, the output of inverter 345 is a high logic level, and the combination logic (gates 302, 304, 306, 308, 310, 312, 314, and 316) does not affect the input to the counter flip-flops. When the cell size value is equal to Q[6:0], (e.g. seven cycles before the write address equals the cell size value), the comparator 332 generates an active "EQ7" signal. After the completion of "7" clock cycles, an active "EQ" signal is generated from flip-flip 346. At this time, the inputs to counter flip-flops (318, 320, 322, 324, 326, 328 and 330) are reset to "00001000", respectively. After one clock cycle, the counter flip-flop Q3 is set to a "1", and the value of Q[6:0] is "0001000." Consequently, the write variable cell size circuit 300, using signal "EQ", is preset for a write operation to a new cell.

For the embodiment shown in FIG. 4, the write variable cell size circuit also includes a hard reset function. For this function, the counter flip-flops (318, 320, 322, 324, 326, 328 and 330) as well as the prediction flip-flops (334, 336, 338, 340, 342, 344, and 346) contain a reset input, and the reset signal, RST, is used to reset all flip-flops. Because the flip-flops are reset with a low logic level, the RST signal is input to inverter 350.

Figure 5:
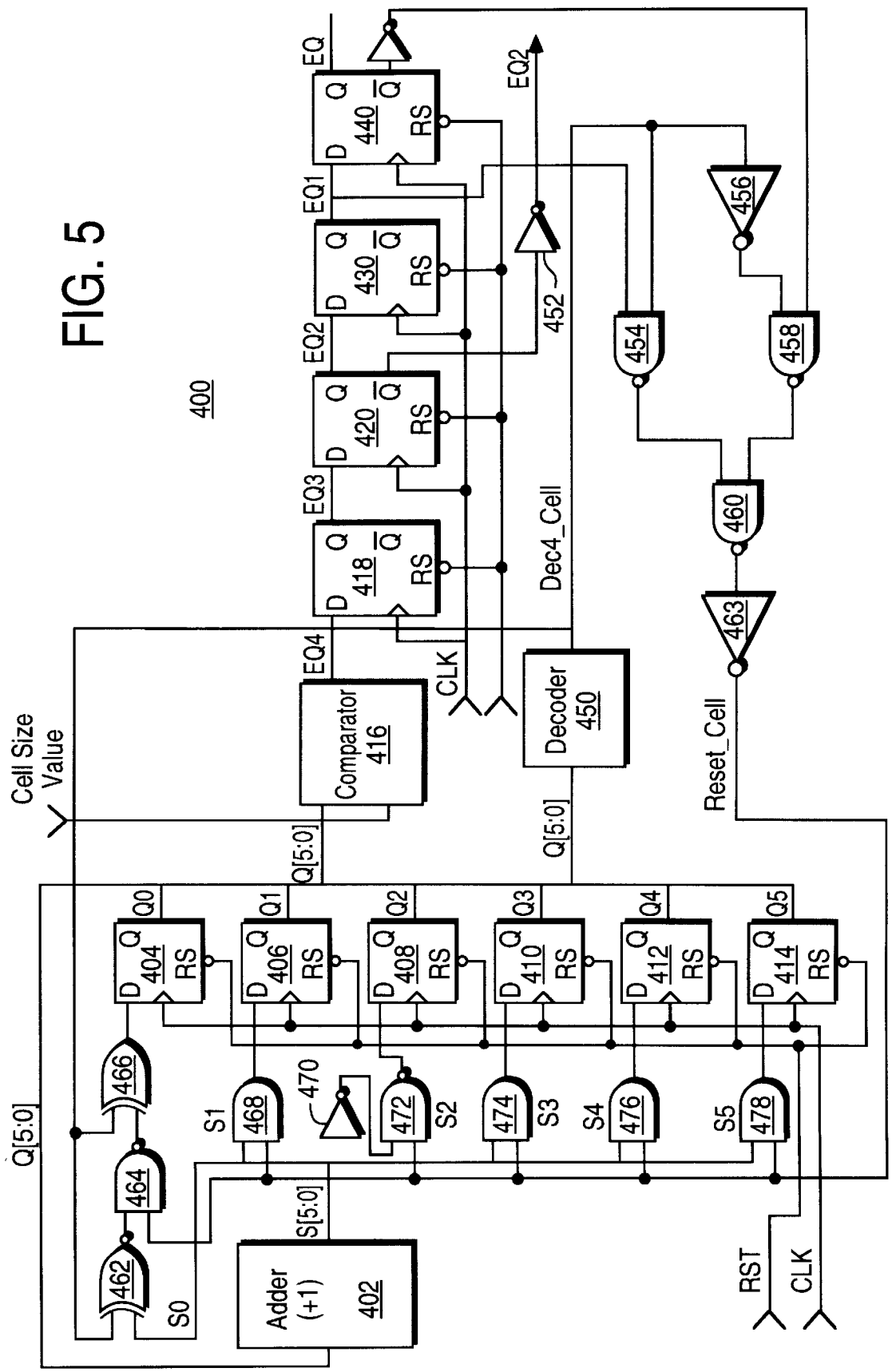
FIG. 5 illustrates one embodiment for a read variable cell size circuit.

FIG. 5 illustrates one embodiment for a read variable cell size circuit. The read variable cell size circuit 400 is used to read cells from a FIFO core, wherein the cell is programmed to have a variable number of bytes per cell during the device power up and reset operation. Similar to the write variable cell size circuit illustrated in FIG. 4, the read variable cell size circuit 400 contains a counter that includes an adder 402 and a plurality of counter flip-flops (404, 406, 408, 410, 412, and 414). The data output from the counter flip-flops are transferred on a data bus, labeled Q[5:0] on FIG. 5. The read variable cell size circuit 400 also includes a comparator 416. The data from bus Q[5:0] is input to the comparator 416 as a first input, and the cell size value is input as a second input. The output of comparator 416, "EQ4", which is set to a high logic level when the size value equals the Q[5:0] value, is input to a plurality of prediction flip-flops (418, 420, 430, and 440).

As shown in FIG. 5, the output of the counter flip-flops (404, 406, 408, 410, 412, and 414) are input to the adder 402. In turn, the adder 402 generates a sum of Q[5:0]+1 for input to the counter flip-flops (404, 406, 408, 410, 412, and 414). For a non reset condition, the adder 402 output S[5:0] is input to the counter flip-flops (404, 406, 408, 410, 412, and 414). When the cell size value is equal to the Q[5:0] value, then the comparator 416 generates an active "EQ4" signal, and an active "EQ" signal is generated four clock cycles later at the output of the prediction flip-flop 440.

The read variable cell size circuit 400 further includes combination logic to reset the cell count. Similar to the write variable cell size circuit 300, the combination logic includes a plurality of AND gates (468, 474, 476, and 478) coupled to the D input of counter flip-flops 406, 410, 412 and 414. Also, the combination logic includes an inverter 470 and a NAND gate 472. Furthermore, the combination logic includes a decoder 450 and a plurality of logic gates (463, 460, 454, 458, 456, 462 and 466), to support a read cell size of 4 bytes per cell (i.e. 8 bytes per cell in write mode operation). The decoder 450 receives the data Q[5:0], and it generates an internal signal "dec4_cell".

If the read cell size equals four, then the dec4_cell signal causes the XOR gate 462 to act as a buffer and the XOR gate 466 to act as an inverter. Also, the dec4_cell disables the AND gate 468. Two bytes prior to the completion of the count the internal signal "reset_cell" is asserted. The reset_cell signal causes the input of the counter flip-flops (404, 406, 408, 410, 412 and 414) to a value of "00100." Thus, the counter flip-flops (404, 406, 408, 410, 412 and 414) are set for the next cell count.

If the read cell size is greater than four, then the input to the counter flip-flops (404, 406, 408, 410, 412 and 414) is the same as the input to the counter flip-flops (318, 320, 322, 324, 326, 328 and 330) of the write variable cell size circuit of Figure .4, Specifically, XOR gate 462 operates as an inverter, and XOR gate 466 operates as a buffer. Also, the signal "reset_cell" disables the combination logic (464, 468, 472, 474, 476 and 478). The input value to the counter flip-flops (404, 406, 408, 410, 412 and 414) is "000101."

Figure 6:
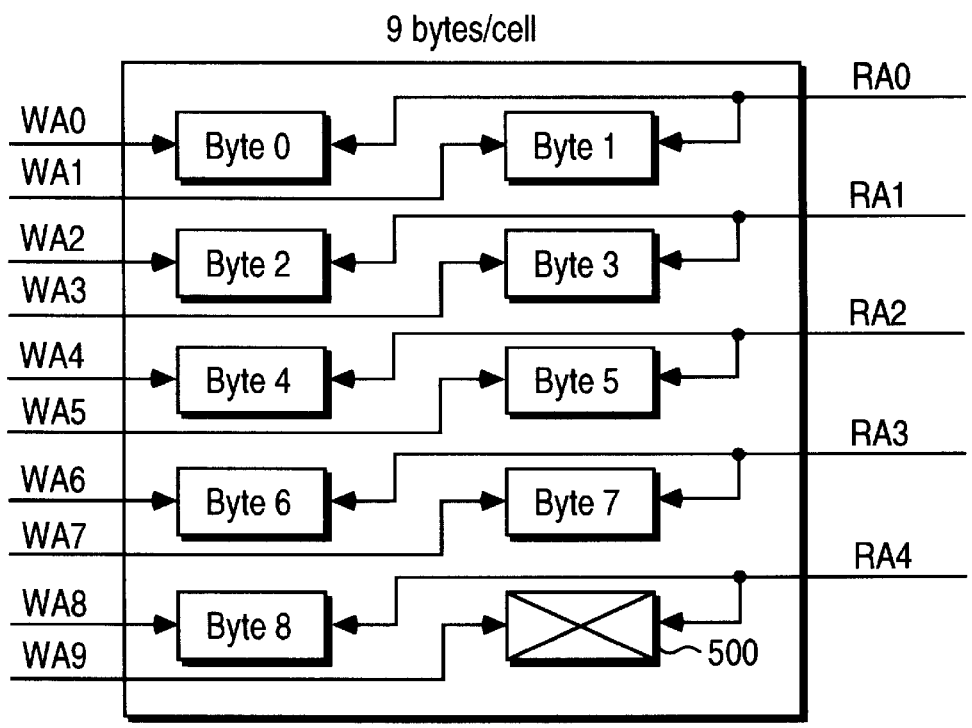
FIG. 6 is a block diagram of a cell in a memory core that has been programmed to include nine bytes per cell.

Byte Alignment in FIFO Cells:

A FIFO device that is configured in accordance with the UTOPIA specification receives, from each physical device, nine bits for input, and it outputs eighteen bits (e.g. two nine bit bytes) to an output device, such as an ATM device. Therefore, for a read operation, bytes are grouped in two byte pairs such that each read operation reads two bytes that were written in separate write operations. FIG. 6 is a block diagram of a cell in a memory core that has been programmed to include nine bytes per cell. For this example, the write variable cell size circuit generates nine write addresses WA[8:0] to execute a write operation to each byte [8:0] of the cell. To execute a read operation from the cell, the read variable cell size circuit 400 generates five addresses RA[4:0], one address for two bytes. For this example, the address "RA0" identifies bytes "0" and "1", the address "RA1" identifies bytes "2" and "3", the address "RA2" identifies bytes "4" and "5", the address "RA3" identifies bytes "6" and "7", and the address "RA4" identifies byte "8." However, since there are nine bytes per cell, only one address, "RA4", is required to identify one byte, byte "8." Therefore, an alignment problem occurs in the read operation when an odd number of bytes per cell are specified.

In one embodiment, the FIFO device 100 provides a predetermined operation on a byte so that the output of a read operation for a cell having an odd number of bytes per cell is predictable. In general, with alignment, all byte positions store data in accordance with predetermined criteria. For example, in the nine bytes per cell example illustrated in FIG. 6, the origin of the contents stored in the tenth byte position, labeled 500 in FIG. 6, is predefined so that the data contents is predictable for a standard UTOPIA read using the "RA4" address. In one embodiment to implement alignment, an insertion operation is utilized. In an insertion operation, the FIFO device inserts a copy of the low byte into the high byte position. For the nine bytes per cell example shown in FIG. 6, the contents of byte "8" are copied into the byte position labeled 500 position for the insertion operation. Also, alignment is accomplished through a deletion operation. In a deletion operation, the byte being deleted is overwritten by the previous byte.

As discussed above, alignment of bytes in a cell may be accomplished through use of the insertion and/or deletion operations. Table 1 below illustrates example operating modes for a FIFO memory with programmable cell sizes.

TABLE 1

| Mode | Tx/Rx | Byte Size | Insert/Del BDI | Result | Cell Size Range | Cell Size Range |
|---|---|---|---|---|---|---|
| 1 | x | Even | 0 | No added or deleted bytes | 8_128 | Cs + 0 |
| 2 | x | Odd | 0 | Byte insert to last byte position | 9–127 | Cs + 1 |
| 3 | Tx | Even | 1 | Delete byte 5 Insert last byte | 8_128 | Cs + 0 |
| 4 | Rx | Even | 1 | Insert byte 6 Insert last byte | 8_126 | Cs + 2 |
| 5 | Tx | Odd | 1 | Delete byte 5 | 9–127 | Cs – 1 |
| 6 | Rx | Odd | 1 | Insert byte 6 | 9–127 | Cs + 1 |

In one embodiment, the programmable cell size of the FIFO device ranges between 8 and 128 bytes per cell.

As shown in Table 1, the FIFO device includes a plurality of modes of operation, modes 1–6, for aligning a cell during a write operation. For this embodiment, the operation depends upon whether the corresponding memory core is for receiving or transmitting. The receive and transmit mode is designated by a signal, RTS. A signal, BDI, indicates a byte insertion or deletion operation for alignment. For this example, mode 1 specifies that no bytes are added or deleted. Thus, for mode 1, the cell size range is between 8 and 128 bytes per cell, and no cell size adjustment is required. For mode 2, the byte size is odd, and to accomplish byte alignment in this mode, a byte is inserted in the last byte position. Therefore, for mode 2, the cell size range is between 9 and 127 bytes per cell, and the cell size is adjusted by 1 (e.g. CS+1). As shown in the additional entries of Table 1, each mode specifies an alignment operation, either deletion, insertion, or both deletion and insertion. Note that for insertion and deletion alignment operations, the cell size range may be limited. For example, in mode 6, executing an insertion operation on byte 6 limits the cell size range from 9 to 127 bytes per cell.

Figure 7:
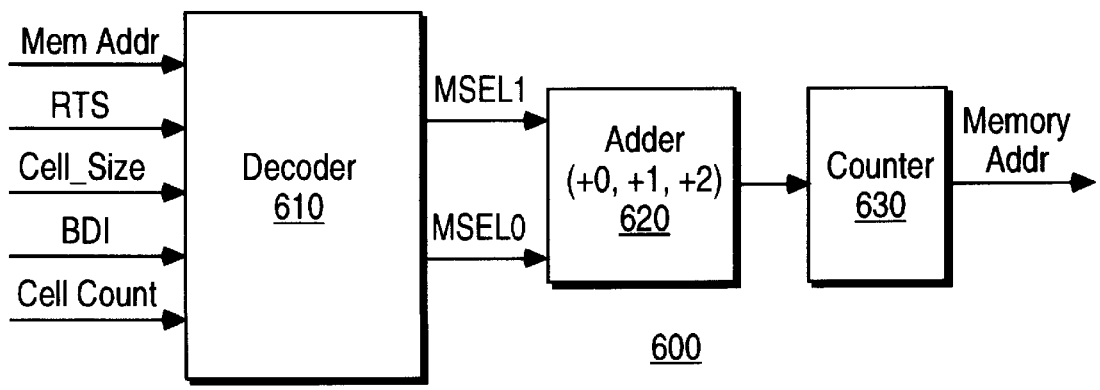
FIG. 7 illustrates one embodiment for a circuit to generate a memory address for a write operation that executes alignment operations.

FIG. 7 illustrates one embodiment for a byte alignment circuit to generate a memory address for a write operation. As shown in FIG. 7, the memory address circuit 600 includes a decoder 610, an adder 620, and a counter 630. The memory address circuit 600 receives, at the decoder 610, a plurality of address and control signals, and the counter 630 generates a memory address for the next write operation to a specified cell. For the embodiment discussed above in conjunction with Table 1, the decoder 610 receives the transmit/receive (RTS) signal, the least significant cell size, the insertion/deletion signal (BDI), and a cell count. The decoder 610, based on a predetermined specification such as the specification shown in Table 1, generates two control signals, MSEL0 and MSEL1. The control signals MSEL1 and MSEL0 control the adder to either add "0" to the memory address, add "1" to the memory address or add "2" to the memory address. For a regular write operation (e.g. no alignment is required), the adder 620 adds 1, thereby incrementing the memory address by "1." For an insertion operation, the adder 620 increments by "2" to advance the memory address by two locations. For the deletion operation, the adder 620 adds "0" to the memory address, thereby executing the write operation at the same address location as the prior write operation.

As shown in FIG. 7, the adder 620 receives the add 0, +1, and +2 indications to generate the memory address. Although specific control signals are shown input to decoder 610 to implement the specification shown in Table 1, any criteria may be used to execute an insertion or deletion operation for alignment without deviating from the spirit and scope of the invention. The output of counter 630, the memory address, is input to the memory core cell to execute a write operation. The decoder 610 also receives the memory address to determine the byte for the next write operation. For example, in mode 3, a deletion operation is executed on byte 5. Thus, the decoder 610 utilizes the memory address to determine the byte count for that write operation. The decoder 610 may be implemented in combination logic.

Multiplexer Function:

As shown in FIG. 1, each FIFO block (FIFO A 130, FIFO B 135, FIFO C 140 and FIFO D 145) generates a cell available signal, labeled iclav_a, iclav_b, iclav_c, and iclav_d, respectively. The arbiter 150 utilizes the cell available signals (iclav_a, iclav_b, iclav_c, and iclav_d) to determine if a cell is available in the corresponding FIFO. If a cell is not available for a particular FIFO, then the arbiter 150 does not select that FIFO for a read cell operation. Also, as shown in FIG. 1, the arbiter 150 generates control signals MUX 0, MUX 1, and load multiplexer (LDM). In turn, the output selection circuit 155 receives the control signals, and through use of a multiplexer, delivers data from the selected FIFO to the ATM 125 via the RX data[17:0] bus.

In one embodiment, each FIFO block includes a circuit to generate the corresponding cell available signal (e.g. iclav_a, iclav_b, iclav_c, and iclav_d). The cell available signal is generated through comparison of a read cell counter and a write cell counter (see FIG. 2). In general, the read cell counter specifies a cell in the corresponding FIFO for the next read operation. Similarly, the write cell counter defines a cell for the corresponding FIFO for the next write operation. For example, if a FIFO device includes 20 cells, and the read cell count is set to 19 and the write cell count is set to 20, then an active cell available signal is generated to reflect that the device has at least one available cell for a read operation. Thus, an active cell available signal is generated if the write cell count is greater than the read cell count. Note that the read cell count will not be greater than the write cell count.

Figure 8:
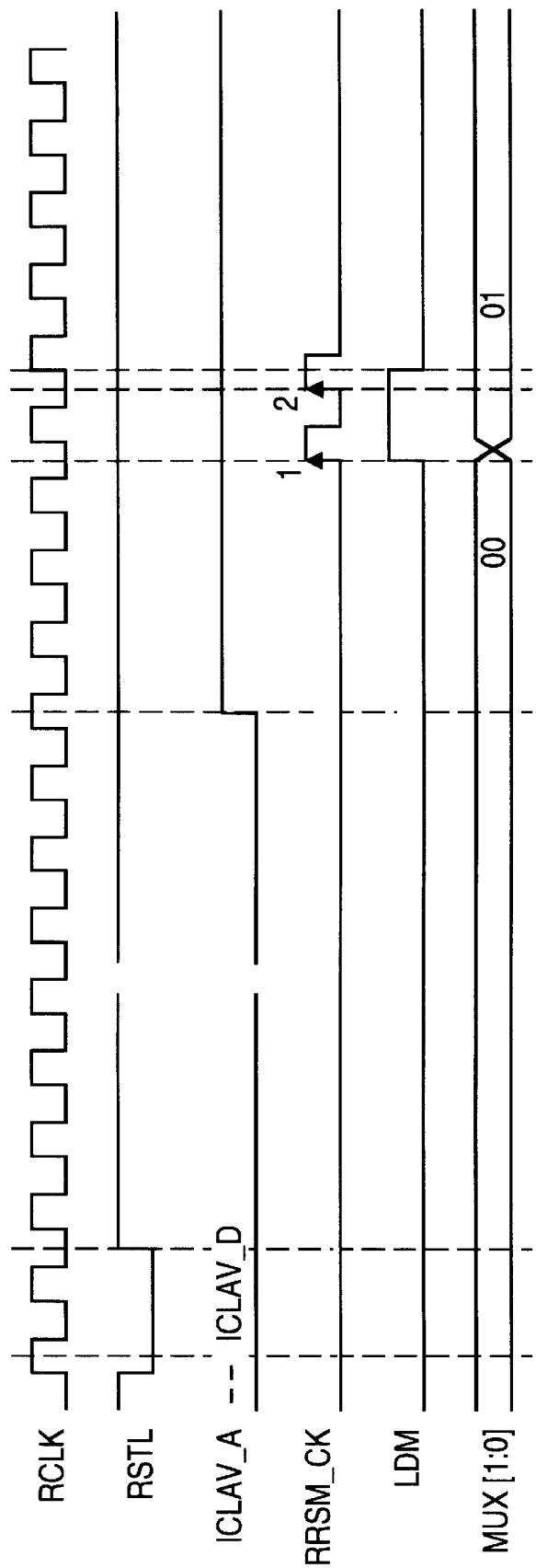
FIG. 8 is a timing diagram illustrating the loading of a MUX for the output selection circuit.

FIG. 8 is a timing diagram illustrating the loading of a MUX for the output selection circuit. As shown in FIG. 8, the cell available signals (iclav_[a:d]) are active when the signals are a high logic level. The load MUX operation utilizes a clock, labeled RCLK on FIG. 8. Furthermore, a timing signal to load the multiplexer, labeled RRSM_CLK, is generated. The arbiter 150 utilizes the RRSM_CLK signal to search for an available cell for a read cell operation. The RRSM_CLK signal is shown as having two cycles on FIG. 8. On the rising edge of the first cycle, the arbiter 150 utilizes the cell available signals to determine whether a FIFO device has a cell available. Based on an arbitration scheme, the arbiter 150, on the rising edge of the second cycle, resets the MUX 0 and MUX 1 control signals to select a new FIFO for the read operation. The arbiter 150 generates the loading MUX (LDM) and the MUX 0 and MUX 1 signals. When the LDM signal goes from a low logic level to a high logic level, the arbiter 150 searches for the target FIFO. When the LDM goes from a high logic level to a low logic level, the arbiter 150 searches for a new MUX to select. FIG. 8 also shows the MUX data, MUX 1 and MUX 0, and the transition of new MUX data on the rising edge of the LDM signal.

Figure 9:
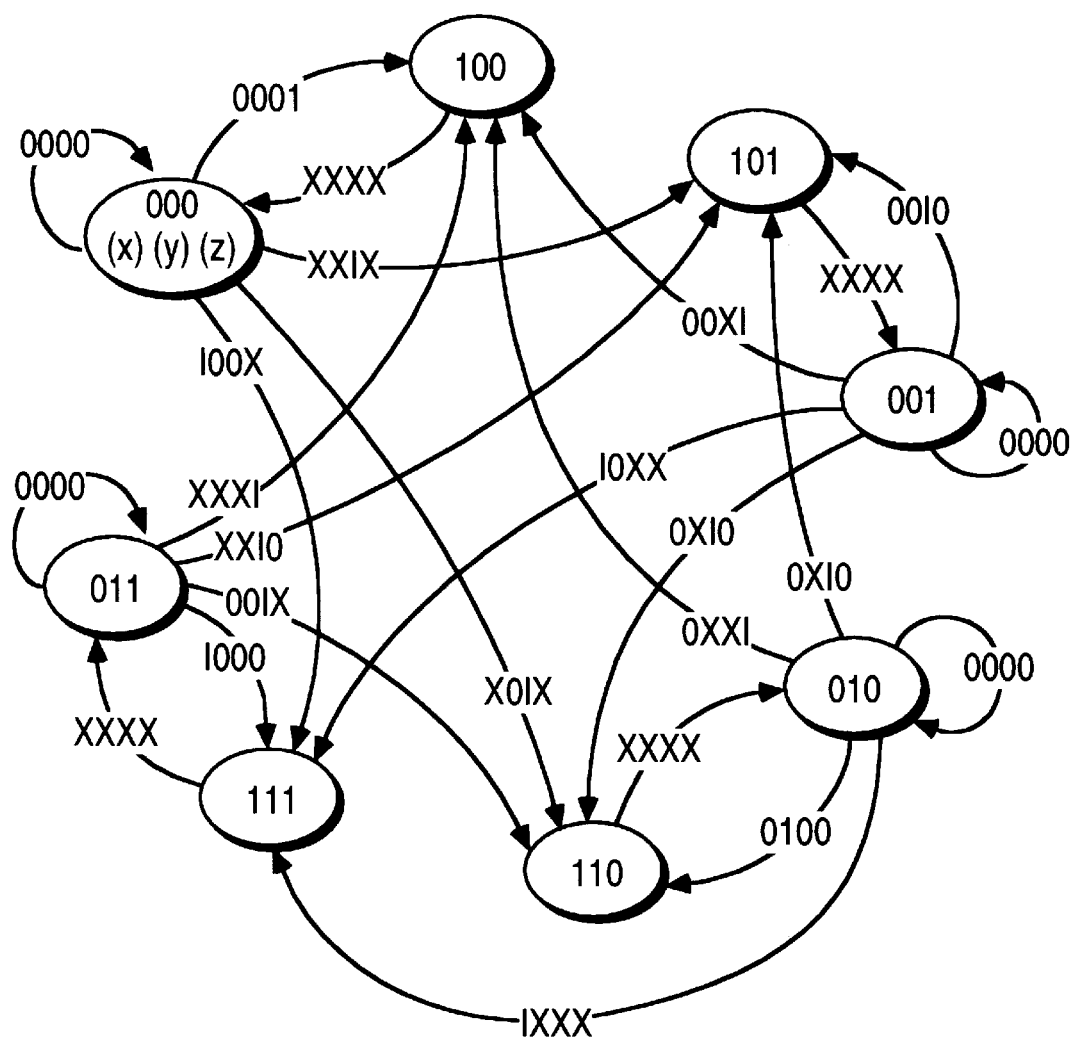
FIG. 9 is a state diagram illustrating one embodiment for an arbiter that selects among FIFO memory cores.

As discussed above, in one embodiment, the arbiter 150 utilizes a round robin arbitration scheme to select a FIFO among all FIFOs that have an available cell. Although the present invention is described in conjunction with an arbiter that utilizes a round robin arbitration scheme, any arbitration scheme may be used without deviating from the spirit and scope of the invention. FIG. 9 is a state diagram illustrating one embodiment for the arbiter 150. Each state in the state diagram corresponds to the state of control signals LDM, MUX 1, and MUX 0 (e.g. state 101 signifies LDM=1, MUX 1=0, and MUX 0=1). The binary numbers that indicate the transitions among states is generated by the cell available signals, wherein the least significant bit is the state of the iclav_a signal, and the most significant bit is the state of the iclav_d signal. Table 2 includes the states of the MUX signals, MUX 0 and MUX 1, for a corresponding FIFO.

TABLE 2

| MUX 1 | MUX 0 | Selection |
|---|---|---|
| 0 | 0 | FIFO A |
| 0 | 1 | FIFO B |
| 1 | 0 | FIFO C |
| 1 | 1 | FIFO D |

As shown in Table 2, the MUX signals MUX 1 and MUX 0 indicate the selection of FIFO A when set to "00", indicate the selection of FIFO B when set to "01", indicate the selection of FIFO C when set to "10", and indicate the selection of FIFO D when set to "11." As shown in FIG. 9, the state diagram indicates the setting of the LDM control signal, and the MUX 1 and MUX 0 select signals based on the state of the cell available signals iclav[a:d]. Note that when all cell available signals are at a low logic level, data for a new MUX is not loaded. The LDM control signal goes active when there is a MUX to select.

In one embodiment, a user of the FIFO device 100 may override the operation of the arbiter 150. For this embodiment, the user receives signals, CR0–CR3, to indicate which FIFOs have an available cell for reading. In a standard FIFO device, the device provides one bit of information to signify whether any of the FIFO cores have an available cell. The CR0–CR3 signals are utilized by a user to set up priority and to select a FIFO. With use of the CR0–CR3 signals, a user of the FIFO device 100 may determine the exact FIFO that has an available cell. Therefore, external control to select a FIFO memory core for output may be implemented.

Figure 10:
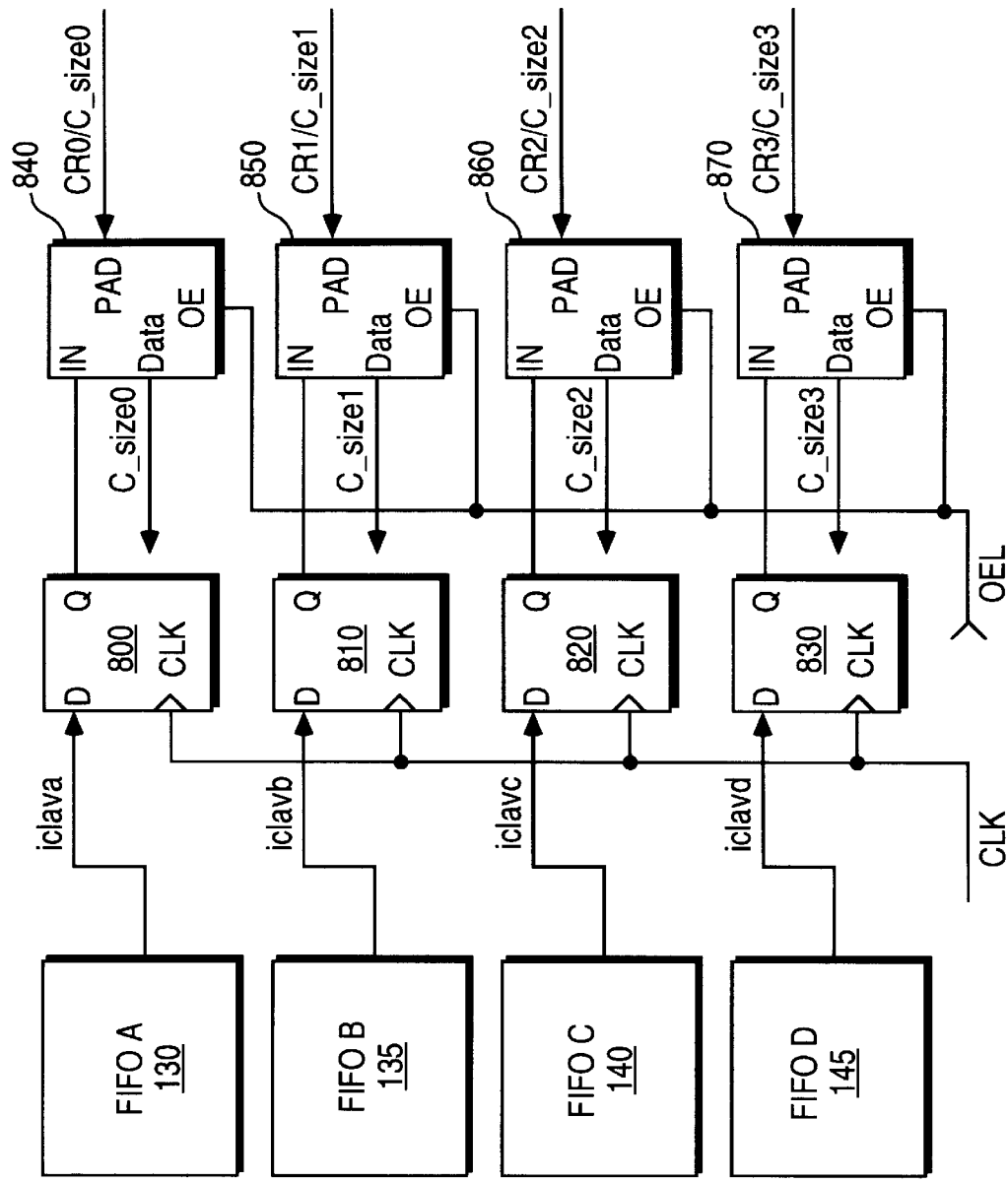
FIG. 10 illustrates one embodiment for a circuit that receives cell size programming information and that transmits cell available information.

FIG. 10 illustrates one embodiment for a circuit that receives cell size programming information and that transmits cell available information. As shown in FIG. 10, for each FIFO memory block (FIFO A 130, FIFO B 135, FIFO C 140, and FIFO D 145) there is a corresponding D type flip-flop (800, 810, 820, and 830) and a corresponding bidirectional driver (840, 850, 860, and 870). For this embodiment, the bidirectional drivers (840, 850, 860, and 870) receive the cell size information (C_Size0–C_Size3) to specify the cell programming information. Also, the bidirectional drivers (840, 850, 860, and 870) transmit the cell available information (CR0–CR3). As shown in FIG. 10, the bidirectional drivers (840, 850, 860, and 870) receive an OEL signal at an OE input. The OEL signal controls the bidirectional drivers to receive, during reset, the cell size programming information, and to transmit the cell available information for a read operation. In one embodiment, the bidirectional drivers are coupled to external pins on the FIFO memory device 100. Thus, for this embodiment, the FIFO device 100 includes pins to transmit the cell available information as well as receive the cell size programming information.

Figure 11:
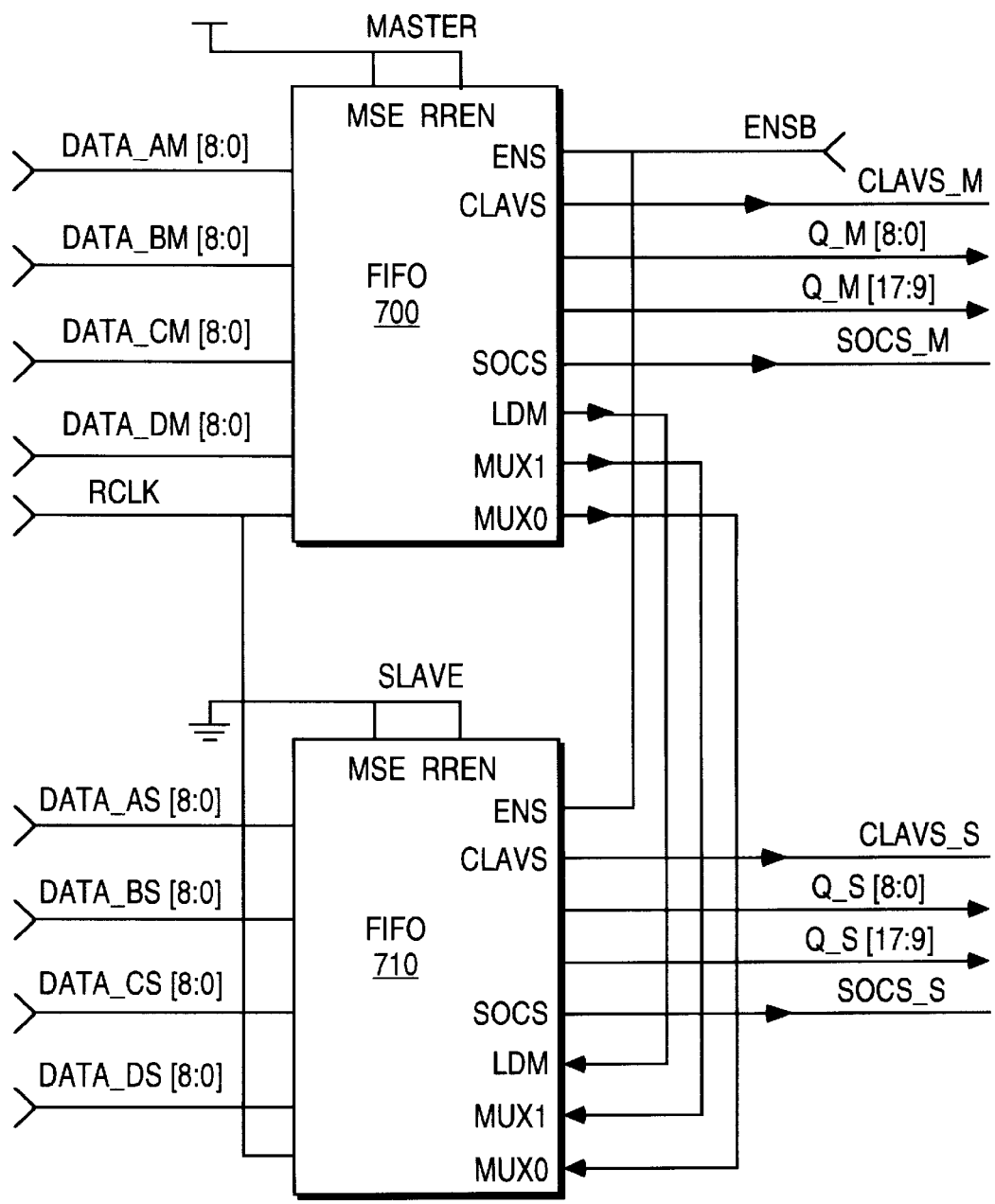
FIG. 11 illustrates one embodiment for expanding the output data bus.

Expansion of Output Data Bus:

In one embodiment, the output data bus may be expanded by synchronizing the output data from two or more FIFO devices. FIG. 11 illustrates one embodiment for expanding the output data bus. FIG. 11 shows two FIFO devices, labeled 700 and 710. For this embodiment, the FIFO device 700 is the master device and the FIFO device 710 is the slave device. Each FIFO device includes MSE and RREN pins. The RREN pin controls the enabling or disabling of the arbiter 150 for the FIFO device. The MSE pin is utilized to determine whether the FIFO device operates as a master or a slave device. The MSE and RREN pins are pulled to a high logic level on the FIFO device 700. For this configuration (e.g. the MSE and RREN pins pulled to a high logic level), the FIFO device 700 operates as a master device to expand the output bus, and selection of a FIFO memory core for output is accomplished through the internal arbiter 150. The MSE and RREN pins on the FIFO device 710 are pulled to a low logic level as shown in FIG. 11. Thus, the FIFO device 710 operates as a slave device for expansion of the output data bus, and the arbiter 150 is disabled such that selection of a FIFO block for output is externally controlled.

In one embodiment, for each FIFO device, an output SOCS signal is generated. The SOCS signal indicates validity of data on the output data bus. As shown in FIG. 11, the master FIFO device 700 receives data on four input data busses (DATA_AM[8:0], DATA_BM[8:0], DATA_CM[8:0], and DATA_DM[8:0]), one for each FIFO block.

Similarly, the slave FIFO device 710 receives data on four separate input data busses (DATA_AS[8:0], DATA_BS[8:0], DATA_CS[8:0], and DATA_DS[8:0]). The master FIFO 700 and slave FIFO 710 include pins for the load MUX (LDM), multiplexer 1 (MUX 1) control, and multiplexer 0 (MUX 0) control. For operation in the master/slave mode, the LDM, MUX 1, and MUX 0 pins are tied together as shown in FIG. 11. The operation of loading the output multiplexer (e.g. output selection circuit 155) and the operation of selecting FIFO blocks within each device is synchronized (e.g. the multiplexers in both the master FIFO device 700 and slave FIFO device 710 are loaded simultaneously). Thus, data for a read operation is output simultaneously as indicated by the SOCS signals on both the master and slave FIFO devices 700 and 710.

In one embodiment, for a single master and a single slave FIFO device, the output bus includes, for the master FIFO device 700, Q_M[8:0] and Q_M[17:9]. The slave FIFO device 710 includes, for an output data bus, Q_S[8:0] and Q_S[17:9]. Thus, for both the master FIFO device 700 and slave FIFO device 710, the output data bus is expanded to 36 bits. Each FIFO device includes an enable pin, labeled ENS on master and slave FIFO devices 700 and 710, to enable the output. The master FIFO device 700 generates the cell available signal, clavs_m to indicate an available cell. For this embodiment, the cell available signal, clavs_s, is ignored (e.g. the state of the clavs_s signal is a don't care condition for the arbiter 150).

Although the present invention has been described in terms of specific exemplary embodiments, it will be appreciated that various modifications may be made by those skilled in the art without departing from the spirit and scope of the invention as set forth in the following claims.

What is claimed is:

1. A memory device comprising:
   at least one memory core configurable into logical cells for storage of at least one byte per logical cell, said memory core comprising a plurality of individual addressable memory locations, wherein each memory core supports configuration of a variable of logical cells and each logical cell supports configuration of a variable number of byte; and
   a variable cell size circuit for receiving a cell size value that specifies a number of bytes per logical cell and for generating a byte address for successive accesses to said memory in accordance with said cell size value, said variable cell size circuit including a counter for incrementing a count to generate a byte address that identifies a memory location within a logical cell, and a comparator, coupled to said counter and coupled to receive said cell size value, for comparing said count with said cell size value, and for resetting said counter when said count equals said cell size value.

2. The memory device as set forth in claim 1, wherein said successive access operations comprise successive write operations.

3. The memory device as set forth in claim 2, wherein said count from said counter signifies a one byte write operation to said memory.

4. The memory device as set forth in claim 1, wherein said successive access operations comprise successive read operations.

5. The memory device as set forth in claim 4, wherein said count from said counter signifies a two byte read operation from said memory.

6. The memory device as set forth in claim 1, further comprising a prediction circuit for indicating completion of said successive access operations a predetermined number of counts prior to completion.

7. The memory device as set forth in claim 6, wherein;

said prediction circuit comprises at least one prediction flip-flop coupled to said comparator for generating an output at least one count prior to when said count equals said cell size value; and said counter comprises a plurality of counter flip-flops, an adder, coupled to receive an output from said counter flip-flops, and combination logic, coupled to receive an output of said adder, for generating a preset value for said counter flip-flops to compensate for said predetermined number of counts generated in said prediction flip-flops.

8. The memory device as set forth in claim 1, wherein said memory device comprises a first-in-first-out memory device.

9. A method for accessing a memory that supports a variable number of bytes per logical cell, said method comprising the steps of:

receiving a cell size value that specifies a number of bytes per logical cell for a memory configurable into logical cells for storage of at least one byte per logical cell;

executing a plurality of successive access operations to a logical cell of individual addressable locations of said memory in accordance with said cell size value each access operation comprising the steps of:
incrementing said count to generate a byte address that identifies a memory location within said logical cell;
comparing said count with said cell size value; and
resetting said count to an initial condition when said count equals said cell size value whereby, said successive access operations to said memory are executed to support storage of a variable number of logical cells and a variable number of bytes per logical cell.

10. The method as set forth in claim 9, wherein the step of executing a plurality of successive access operations to a cell of said memory comprises the step of executing a plurality of write operations.

11. The method as set forth in claim 10, wherein said count signifies a one byte write operation to said memory.

12. The method as set forth in claim 9, wherein the step of executing a plurality of successive access operations to a cell of said memory comprises the step of executing a plurality of read operations.

13. The method as set forth in claim 12, wherein said count signifies a two byte read operation from said memory.

14. The method as set forth in claim 9, further comprising the step of generating a signal to indicate completion of said successive access operations a predetermined number of counts prior to completion.

15. The method as set forth in claim 14, wherein the step of generating a signal to indicate completion of said successive access operations a predetermined number of counts prior to completion comprises the steps of:

generating a signal at least one count prior to when said count equals said cell size value; and generating a preset value to initialize said count so as to compensate for said predetermined number of counts generated.

16. The method as set forth in claim 9, wherein said memory comprises a first-in-first-out (FIFO) memory device.

17. A memory device comprising:

at least one memory core comprising a plurality of individual addressable memory locations, wherein each memory core supports configuration of a variable number of logical cells and a variable number of bytes per logical cell;

a variable cell size circuit for receiving a cell size value that specifies a number of bytes per logical cell and for generating a byte address for successive accesses to said memory in accordance with said cell size value, said variable cell size circuit including a counter for incrementing a count to generate a byte address that identifies a memory location within a logical cell, and a comparator, coupled to said counter and coupled to receive said cell size value, for comparing said count with said cell size value, and for resetting said counter when said count equals said cell size value; and memory address circuit, coupled to said variable cell size circuit, for generating a memory address, from said byte address to identify one of said addressable memory locations in said memory for execution of said successive access operations, whereby said successive access operations to said memory core are executed to support storage of a variable number of bytes per logical cell and a variable number of logical cells in said memory core.

18. A method for accessing a memory that supports a variable number of bytes per logical cell and a variable number of logical cells in said memory, said method comprising the steps of:

receiving a cell size value that specifies a number of bytes per logical cell for a memory configurable into logical cells for storage of at least one byte per logical cell;

executing a plurality of successive access operations to a logical cell of individual addressable locations of said memory in accordance with said cell size value, each access operation comprising the steps of:
incrementing said count to generate a byte address that identifies a memory location within said logical cell;
generating a memory address from said byte address to identify one of said addressable memory locations in said memory;
comparing said count with said cell size value; and
resetting said count to an initial condition when said count equals said cell size value, whereby, said successive access operations to said memory are executed to support storage of a variable number of bytes per logical cell and a variable number of logical cells in said memory.

* * * * *